United States Patent [19]

Aoyama et al.

[11] Patent Number: 5,073,970
[45] Date of Patent: Dec. 17, 1991

[54] VECTOR PROCESSING APPARATUS ALLOWING SUCCEEDING VECTOR INSTRUCTION CHAIN PROCESSING UPON COMPLETION OF DECODING OF A PRECEDING VECTOR INSTRUCTION CHAIN

[75] Inventors: Tamoo Aoyama, Hadano; Yasuhiro Inagami, Kodaira; Hiroshi Nurayama, Hadano, all of Japan

[73] Assignees: Hitachi, Ltd., Tokyo; Hitachi Computer Engineering Co., Ltd., Hadano, both of Japan

[21] Appl. No.: 471,667

[22] Filed: Jan. 24, 1990

Related U.S. Application Data

[63] Continuation of Ser. No. 926,444, Nov. 3, 1986, abandoned.

[30] Foreign Application Priority Data

Nov. 13, 1985 [JP] Japan ................ 60-252798

[51] Int. Cl.⁵ ............... G06F 15/76; G06F 9/30
[52] U.S. Cl. ..................... 395/800; 364/DIG. 1; 364/736; 364/232.21; 364/262.9; 364/230
[58] Field of Search ... 364/200 MS File, 900 MS File, 364/736

[56] References Cited

U.S. PATENT DOCUMENTS

| | | | |
|---|---|---|---|
| 4,541,046 | 9/1985 | Wagashima et al. | 364/200 |
| 4,663,730 | 5/1987 | Ikeda | 364/900 |
| 4,722,049 | 1/1988 | Lahti | 364/200 |
| 4,725,973 | 2/1988 | Matsuura et al. | 364/900 |
| 4,739,472 | 4/1988 | Hayashi | 364/200 |
| 4,740,893 | 4/1988 | Buchholz et al. | 364/200 |

FOREIGN PATENT DOCUMENTS

| | | |
|---|---|---|
| 57-106982 | 7/1982 | Japan . |
| 59-043446 | 3/1984 | Japan . |
| 60-178580 | 9/1985 | Japan . |

OTHER PUBLICATIONS

Russell, "The CRAY-1 Computer System," *Communications of the ACM*, vol. 21, No. 1, Jan. 1978.
Odaka et al., "Hitachi Supercomputer S-810 Array Processor System", *Supercomputers*, (1986).

*Primary Examiner*—Thomas C. Lee
*Assistant Examiner*—Paul Harrity
*Attorney, Agent, or Firm*—Kenyon & Kenyon

[57] ABSTRACT

A vector processing apparatus includes a vector processing unit having a vector instruction decoder and a scalar processing unit including a scalar instruction decoder for activating the vector processing unit in response to a scalar instruction commanding initiation of the processing of a vector instruction chain. The vector processing unit further includes an incidation register which is set in response to the initiation of decodiung of the vector instruction chain by the vector instruction decoder and reset in response to the decoding of an end vector instruction of the vector instruction chain. So long as the indication circuit is in the reset state, the vector processing unit is allowed to initiate the processing of a vector instruction chain under the command of the scaler processing unit.

7 Claims, 5 Drawing Sheets

VECTOR PROCESSING APPARATUS ALLOWING SUCCEEDING VECTOR INSTRUCTION CHAIN PROCESSING UPON COMPLETION OF DECODING OF A PRECEDING VECTOR INSTRUCTION CHAIN

This application is a continuation of application Ser. No. 926,444, filed Nov. 3,1988, now abandoned.

BACKGROUND OF THE INVENTION

The present invention relates to a vector processing apparatus which is composed of two processing units, i.e. a scalar processing unit and a vector processing unit.

A vector processing apparatus which includes two kinds of processing units, that is, a scalar processing unit and a vector processing unit which are designed to execute scalar instructions and vector instructions, respectively has been known. In conjunction with the execution of these two types of instructions, there are proposed and adopted at present two kinds of processing strategies.

According to the first processing strategy, a mixed series or chain of instructions including scalar instructions and vector instructions in a mixed sequence, is decoded by a decoder for controlling executions of the individual instructions. A typical example of such a strategy is system disclosed in an article by Richard M. Russell; "The CRAY-1 Computer System" contained in "Communications of the ACM", (Jan. 1978).

According to a second processing strategy two types of instructions, i.e. scalar instructions and vector instructions are decoded by using two respective proper decoders. A typical system using this strategy is discussed, for example, in T. Odaka et al's article "HITACHI SUPERCOMPUTER S-810 ARRAY PROCESSOR SYSTEM" contained in "SUPERCOMPUTERS" published by Elevier Science Publishers B.V. (North-Holland), 1986. In this system, instructions are decoded by two logical units.

The first system is characterized in that control over two species of instructions inclusive of the control for ensuring proper sequence established between the scalar instructions and the vector instructions can be realized in a facilitated manner by virtue of the fact that the scalar instructions and the vector instructions are present admixedly.

On the other hand, the second system allows the two types of instructions to be executed independent of each other to thereby facilitate the parallel processing because the scalar instruction processing or decoding unit is separated from the vector instruction processing unit. However, the independence of the scalar processing unit and the vector processing unit from each other means in turn that the vector processing unit has to be activated by the scalar processing unit. For activation of vector processing unit, all variety of information required for initiating the vector processing has to be set up by the scalar processing unit. This setting-up processing tends to involve an extended time for preparation before the vector computation is started, rendering it difficult or even impossible to make use of the functional performance specific to the vector processing unit for the computation of vectors of short vector length. Additionally, the second mentioned system requires means for informing the scalar processing unit of the fact that a given processing of significance has been completed on the part of the vector processing unit at a given time.

As will be understood from the above description, the second system can enjoy a greater degree of freedom over the first system because of the capability of parallel processing, and is more effective for realizing advanced parallel computation. However, in order to combine the advantages over the first system with the performance of the processing units of the second system, adequate consideration must be paid to the activation of the vector processing unit and the synchronous control of the scalar processing unit.

SUMMARY OF THE INVENTION

It is therefore an object of the present invention to provide a vector processing apparatus which can activate the vector processing unit at a high speed.

In view of the above and other objects which will become apparent as the description proceeds, it is disclosed, according to an aspect of the present invention that indication means is provided which is set upon a starting of decoding of an instruction chain by a vector instruction decoder and which is reset upon decoding of the end vector instruction located at the end of the vector instruction chain, wherein a command for starting the processing of the vector instruction chain is issued from the scalar processing unit to the vector processing unit when the indication means is in the reset state.

The above and other objects, features and advantages of the present invention will be more apparent upon consideration of the following detailed description of the preferred embodiments thereof taken in conjunction with the accompanying drawings.

DESCRIPTION OF THE PREFERRED EMBODIMENTS

For having a better understanding of the present invention, the underlying basic concept thereof will be elucidated before entering into description of the preferred embodiments.

Figure 1A:
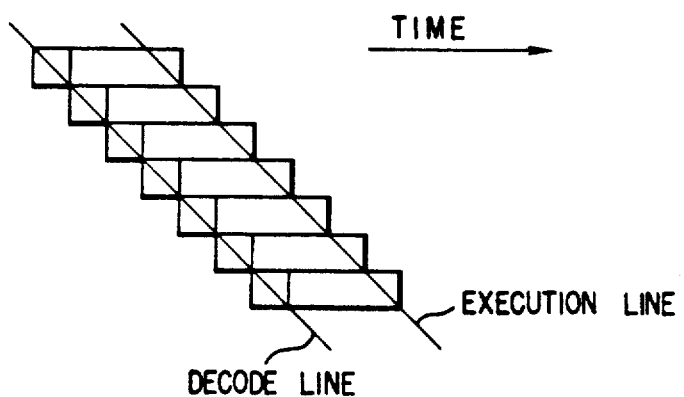
FIGS. 1a and 1b are views for illustrating manners in which a set of scalar instructions and a set of vector instructions are processed through pipeline control, respectively.
Figure 1B:
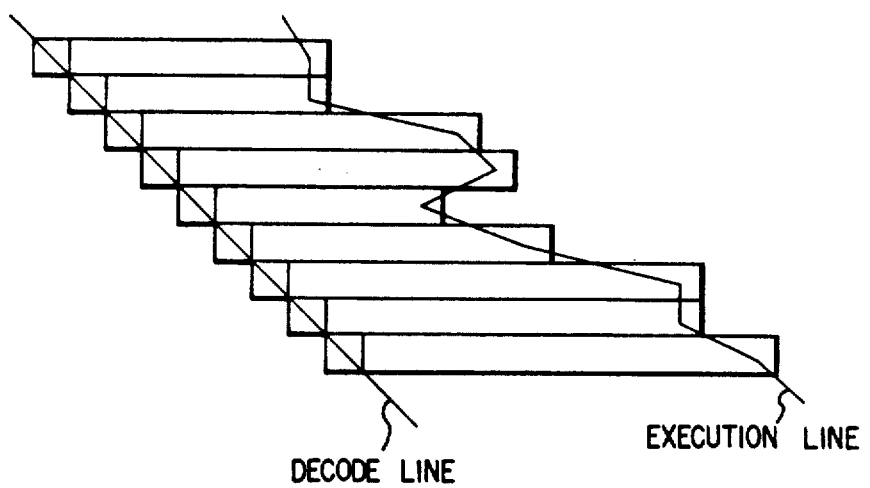

FIGS. 1a and 1b illustrate the nature of the scalar processing and the vector processing in diagrams each showing correlation between the time and the instruction processing.

More specifically, FIG. 1a illustrates how a group or set of scalar instructions are sequentially processed by a scalar processing unit through a pipeline control. A line depicted in FIGS. 1a and labelled "decode line" represents a line segment resulting from interconnection of stages for decoding instructions. Similarly, an execution line depicted in FIG. 1a is defined by a line segment interconnecting those portions of instructions whose execution has been completed. FIG. 1b illustrates how the vector instructions are processed. The execution line of the vector instructions is defined by a line segment interconnecting the processing stages of the final or end vector elements of vector instructions, respectively. Differences between the vector instruction processing and the scalar instruction processing can be seen in that:

(1) in the case of the vector processing, completion of processing for executing an instruction issued earlier does not always precede the completion of processing for executing an instruction issued later, and (2) the instruction decode line and the execution line in the vector processing are distanced from each other greater than those in the case of the scalar processing.

The differences mentioned above indicate that initiation of the vector processing and the control thereof are difficult to be carried out on the basis of the same principle or concept underlying the scalar processing. For example, in the case of the scalar processing, the result of processing of an instruction issued earlier can be made known by setting a condition code, because the time span intervening between the instruction execution line and the instruction decode line is short and because execution of an instruction issued earlier necessarily precedes the execution of an instruction issued later, which are inherent to the logic operation of the scalar processor. In contrast, in the case of the vector processing control, it can not be assured that completion of execution of an instruction issued earlier always precedes the completion of execution of an instruction issued later in the execution line, making thus impossible the control of execution of a chain of instructions by resorting to the concept of setting up the condition code. However, so far as the decode line of vector instructions is concerned, it will be seen that a control procedure required for the decode processing of the vector instructions is similar to that of the scalar instructions. These two different properties characterize the instruction processing executed by the vector processing unit.

Now, consider a vector processing system in which the vector processing for a vector instruction chain is performed by supplying activation information to the vector processing unit. In the case of the hitherto known vector processing apparatus, the state of the vector processing unit is discriminatively identified by making decision as to "whether vector processing is being performed or not". When the discriminative identification of the vector processor state as mentioned above is adopted, necessity of controlling the parallel execution of vector processing to full details arises in connection with the processing of a program constituted by a plurality of vector instruction chains, when the processing of a given instruction chain is to be started during the processing of another vector instruction chain. In other words, it is necessary to supervise and manage the state of the vector processor in correspondence with n vector instruction blocks which are subjected to the vector processing. Such control is not only difficult but also accompanied by the possibility of hardware resources being necessarily increased enormously.

On the other hand, when the state of the vector processor is to be supervised or managed in two respects, i.e. in terms of the vector instruction decode line and the vector instruction execution line, control procedure adopted in the scalar processor can be utilized by taking advantage of the fact that the vector instruction decode line has same nature or property as the scalar instruction decode line. By way of example, control by the hardware can be performed such that when resource required for execution of a vector instruction can be allocated for executing a vector instruction in concern after decoding thereof, that vector instruction is activated, while when no resource is available for allocation to the execution of the vector instruction, decoding of that vector instruction is interrupted until the resource becomes free of occupation. In that case, decoding of another succeeding vector instruction chain can be started immediately after completion of the decoding of a preceding vector instruction chain. In this way, so long as the decoding of a vector instruction chain has been completed, decoding of another vector instruction chain can be initiated even when execution of the decoded vector instruction chain is not yet completed. Through the control procedure mentioned above, the state of the vector processing unit can be supervised and managed with regards to only two respects, i.e. decoding and completed execution of vector instructions, involving no necessity of adopting a complicated control procedure such as decision as to whether the vector processing unit is executing a plurality of vector instruction chains in parallel. Thus, the parallel processing can be automatically realized facilitatively in dependence on the number of resources incorporated in the vector processing unit. Further, the quantity of hardware required for performing the control procedure mentioned above can be limited to the buffers destined to serve as vector length registers (hereinafter referred to as the length register) and an address register in addition to a group of registers for holding the two information mentioned above. This control will be described below in more detail.

It is now assumed that two vector instruction chains are to be processed and that a first one of the instruction chains is being processed in a vector processing unit. Assuming that the first vector instruction chain consists of n vector instructions, the time taken for decoding the vector instructions approximately corresponds to about n machine cycles. On the other hand, the time required for executing the vector instructions mentioned above corresponds to (n×l) machine cycles (where l represents the length of the vector instruction to be processed) even in the case a sufficient number of resources is available. In view of the fact that the number of resources included in a vector processing unit is ordinarily five or six at the most, the number of resource is smaller than n in most cases. Accordingly, the following relationship will apply valid.

Time for processing vector instructions >> Time for decoding vector instructions.

On these conditions, it is now assumed that a request for executing an instruction chain which differs from the one being currently executed is issued by a scalar processing unit. In that case, the probability of the decoder of the vector processing unit being not occupied is high, which in turn means that the decoding of a vector instruction chain transferred from the scalar processing unit is allowed to be initiated with a correspondingly high probability. At the time point at which the decoding is initiated, the resources included in the vector processing unit are executing the processing of the preceding vector instruction chain.

For processing of a vector instruction, vector length data is sent to the vector processing unit for executing that vector instruction simultaneously with activation of that vector instruction. At that time, when the processing of a vector instruction differing from the activated one is being executed, the vector processing unit may perform erroneous operation if the vector length is different for both the vector processings.

The concept of the vector processing illustrated in FIG. 1 resides in that upon decoding of a vector instruction, resource for executing that instruction is allocated for performing the processing commanded by the vector instruction itself. By making use of this nature, such procedure is adopted in which the vector length data is mapped to the resource from the vector length register upon activation of the instruction. According to this procedure, the value stored in the vector length register may be confirmed only at the time of activation of the vector instruction for assuring correct operation of the vector processing unit. Same applies valid to the address register.

For discriminating the status in which the reading of a vector instruction chain from a main storage is interrupted due to bank conflict or the like from the status in which the decoding of a vector instruction chain has been completed, a vector instruction for informing the vector processing unit of the completed decoding of the vector instruction chain is added to the vector instruction chain at the end thereof. This end vector instruction creates the state in which the vector processing unit is capable of accepting another vector instruction chain.

By adopting the control procedure described above in the vector processing unit, a plurality of vector instruction chains can be successively executed in the vector processing unit without involving any significant increase in the quantity of hardware.

Figure 2:
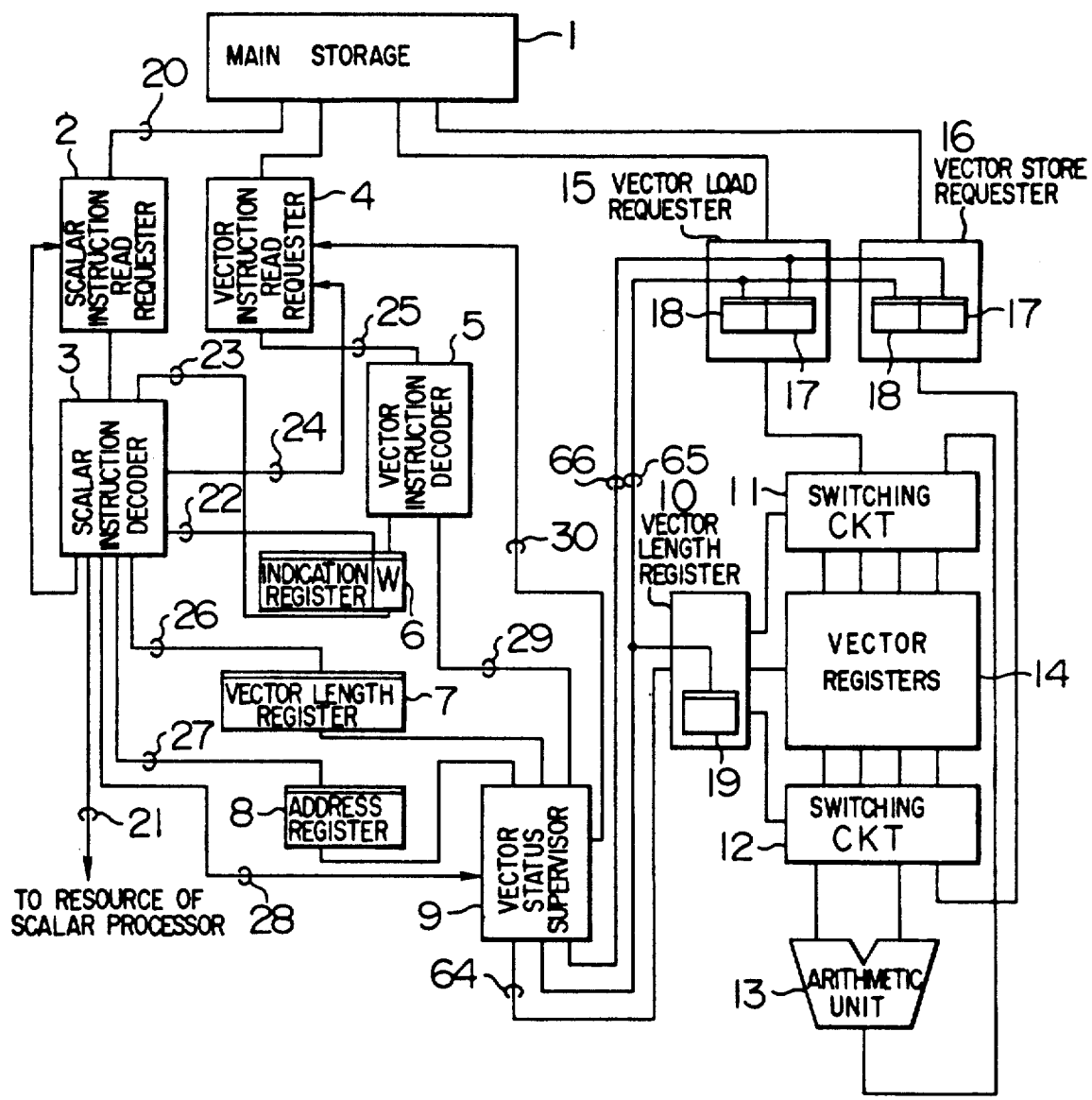
FIG. 2 is a view showing in a block diagram a general arrangement of a vector processing apparatus according to an exemplary embodiment of the present invention.

FIG. 2 shows a general arrangement of a vector processing apparatus according to an exemplary embodiment of the present invention.

In FIG. 2, a reference numeral 1 denotes a main storage (MS), 2 denotes a scalar instruction read requester, 3 denotes a scalar instruction decoder, 4 denotes a vector instruction read requesting circuit (hereinafter referred to as the vector read requester), 5 denotes a vector instruction decoder, 6 denotes a vector processor status word, 7 denotes a vector length register, 8 denotes an address register, 9 denotes a vector status supervisor circuit, 10 denotes a vector register controller, 11 and 12 denote switching circuits, respectively, 13 denotes a vector arithmetic unit (which may include a plurality of adders, multipliers and others capable of performing operations in parallel), 14 denotes vector registers, 15 denotes a vector load requester, and a numeral 16 denotes a vector store requester. It should be mentioned that although a plurality of vector registers 14 are provided in actuality, they are indicated collectively by a single block only for the purpose of simplifying illustration.

Upon activation of the vector processing apparatus, the scalar instruction read requester 2 reads out a scalar instruction chain from the main storage 1 through a path 20, the scalar instructions thus read out being sent to the scalar instruction decoder 3. The latter then decodes the scalar instruction chain and sends a command for execution of that instruction chain to a resource of a scalar processor (not shown) by way of a path 21. The scalar instruction read requester 2, the scalar instruction decoder 3 and the resource of the scalar processor cooperate to constitute a scalar processing unit, while the remaining parts constitute a vector processing unit. Upon decoding of an instruction commanding the start of processing of a vector instruction chain (hereinafter referred to as the EXVP instruction), the scalar instruction decoder 3 checks by way of the paths 22 and 23 the bit (hereinafter referred to as W-bit) included in the vector processor status word 6 and indicative of the status of the decoder included in the vector processing unit. It is to be noted that the W-bit is in the reset state at the time of activation of the vector processing apparatus and is set when a vector instruction is being decoded. The W-bit is again reset when the instruction indicating the end of the vector instruction chain is decoded by the vector instruction decoder 5. When operation of the vector instruction decoder 5 is idling because of interruption in reading the vector instruction chain from the main storage 1 due to the bank conflict or the like cause, the condition is regarded similarly to that when the vector instruction is being decoded. Accordingly the W-bit is prevented from being reset.

When the W-bit is reset, the scalar instruction decoder 3 activates the vector instruction read requester 4 through the path 24. Subsequently, the start address of the vector instruction chain indicated by an operand of the EXVP instruction is transmitted to the vector instruction read requester 4 through the path 24.

The vector instruction read requester 4 reads out a vector instructions from the designated address of the main storage 1 to the vector instruction decoder 5 through the path 25. The vector instruction decoder 5 then starts the decoding of the vector instructions and at the same time sets the W-bit of the vector processor status word 6. Information of the W-bit being set is sent to the scalar instruction decoder 3 through the path 23. In response, the decoder 3 determines that execution of the EXVP instruction has been completed and starts the decoding of a succeeding scalar instruction chain.

If the W-bit is in the set state when the scaler instruction decoder 3 checks the W-bit upon decoding the EXVP instruction, the scalar instruction decoder 3 continues the processing of EXVP instruction until the W-bit is reset. Because the vector instruction has no branch and because the instruction chain is infinite, the W-bit is reset without fail so long as the program runs normally. When the program is abnormal and no instruction is present which indicates the end of the vector instruction chain, the vector instruction requester 4 reads out data from the main storage 1 at the address succeeding to the vector instruction chain, which data is supplied to the vector instruction decoder 5. Consequently, the vector instruction decodes the other data than the vector instruction, which results in that the processing apparatus detects an instruction exception to thereby interrupt the programmed processing.

When the scalar instruction decoder 3 decodes a scalar instruction commanding the loading of a vector length in the vector length register 7 or a scalar instruction commanding the loading of an address value in the address register 8 (both of these scalar instructions will be collectively referred to as set-up instruction), the vector length and the address value are loaded in the vector length register 7 and the address register 8, respectively. This loading is performed in precedence to the EXVP instruction.

Figure 3:
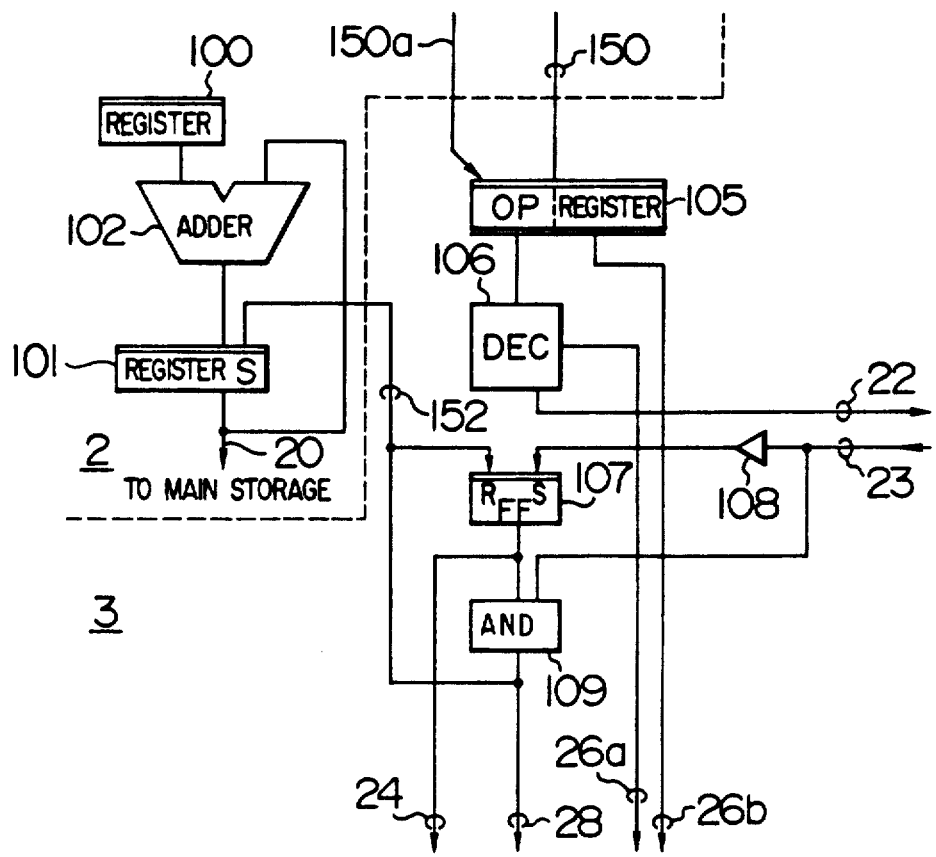
FIG. 3 is a view showing in a block diagram a circuit configuration of a scalar instruction read requester and a scalar instruction decoder employed in the apparatus shown in FIG. 2.

FIG. 3 is a block diagram showing circuit configurations of the scalar instruction decoder 3 and the scalar instruction read requester 2 described above in conjunction with FIG. 2. In FIG. 3, the paths common to those shown in FIG. 2 are denoted by same reference numerals.

In the following description made with reference to FIG. 3, it is assumed that a scalar instruction word length is placed in a register 100. An adder 102 serves to create a scalar instruction address. A register 101 stores therein the address from which a scalar instruction is to be read out. This address is sent to the main storage or MS 1 through the path 20. A scalar instruction read out from the main storage 1 is loaded in a register 105 through a path 150. A line 150a represents an advance line indicating the transfer of instruction. An operation code OP contained in the instruction placed in the register 105 is decoded by a decoder 106. When the instruction decoded by the decoder 106 represents an EXVP instruction, a command is issued for reading out the value of the W-bit through the path 22. The value of the W-bit is read out through the path 23. A flip-flop 107 operates to hold data concerning the execution of the EXVP instruction. More specifically, when the value held by the flip-flop 107 is "1", this means that the EXVP instruction is being executed. On the other hand, the value "0" held by the flip-flop 107 indicates that the EXVP instruction is not executed. When the value of the W-bit is "0", the EXVP instruction in the register 105 can be executed. At that time, the flip-flop 107 is set to "1", whereupon the vector instruction read requester 4 is activated through the path 24.

The vector instruction read requester 4 creates an address for the vector instruction to be read out and sends the address to the main storage 1, whereby the vector instruction is read out from the main storage 1. The vector instruction read out is decoded by the vector instruction decoder 5, whereupon the W-bit is changed over to "1" from "0". Consequently, the signal value on the path 23 is also changed over from "0" to "1". At that time point, the output of the flip-flop 107 and the signal on the path 23 are logically ANDed by an AND circuit 109, whereby the signal value "1" is sent onto a path 28. This signal value "1" indicates completion of execution of the EXVP instruction. Simultaneously with the completed execution of the EXVP instruction, the flip-flop 107 is reset, and an address for a succeeding scalar instruction is loaded in the register 101.

In case instruction placed in the register 105 is one of the set-up instruction mentioned hereinbefore, an enable signal is sent out from the decoder 106 along a path 26a. Simultaneously, the operand in the register 105 is sent out to the vector processing unit through a path 26b. In should be noted that the path 26b shown in FIG. 3 corresponds to the path 26 or 27 shown in FIG. 2 in dependence on the destination of the set-up data.

Figure 4:
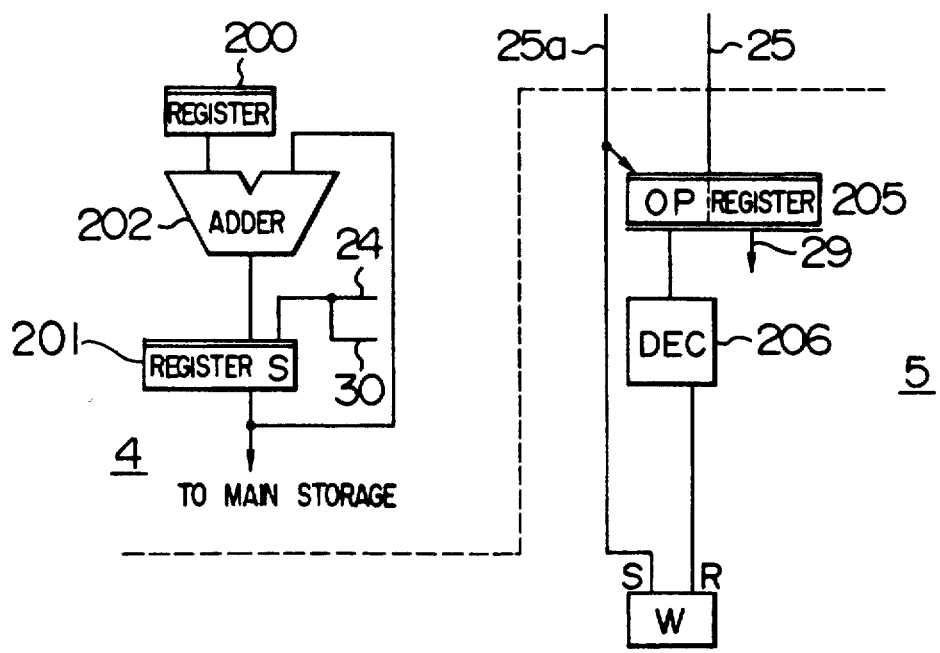
FIG. 4 is a view showing in a block diagram a circuit configuration of a vector instruction read requesting circuit and a vector instruction decoder employed in the apparatus shown in FIG. 2.

FIG. 4 is a block diagram showing circuit configurations of the vector instruction decoder 5 and the vector instruction read requester 4. In the following description made with reference to FIG. 4, it is assumed that a vector instruction word length is placed in a register 200. A reference numeral 202 denotes an adder for creating an address for the vector instruction. A register 201 stores therein the address from which the vector instruction is to be read out. This address is sent to the main storage 1. A line 24 extending from the scalar instruction decoder 3 carries a load command signal for the register 201. The vector instruction read out from the main storage 1 is loaded in a register 205 through the path 25. A path 25a represents an advance line carrying a command for instruction transfer. An operation code OP of the instruction placed in the register 205 is decoded by a decoder 206. The W-bit is set by the advance signal on the path 25a and reset by the instruction indicating the end of the vector instruction chain and a vector processing end instruction on a path 207, the above mentioned end indicating instruction being one of the outputs of the decoder 206.

Figure 5:
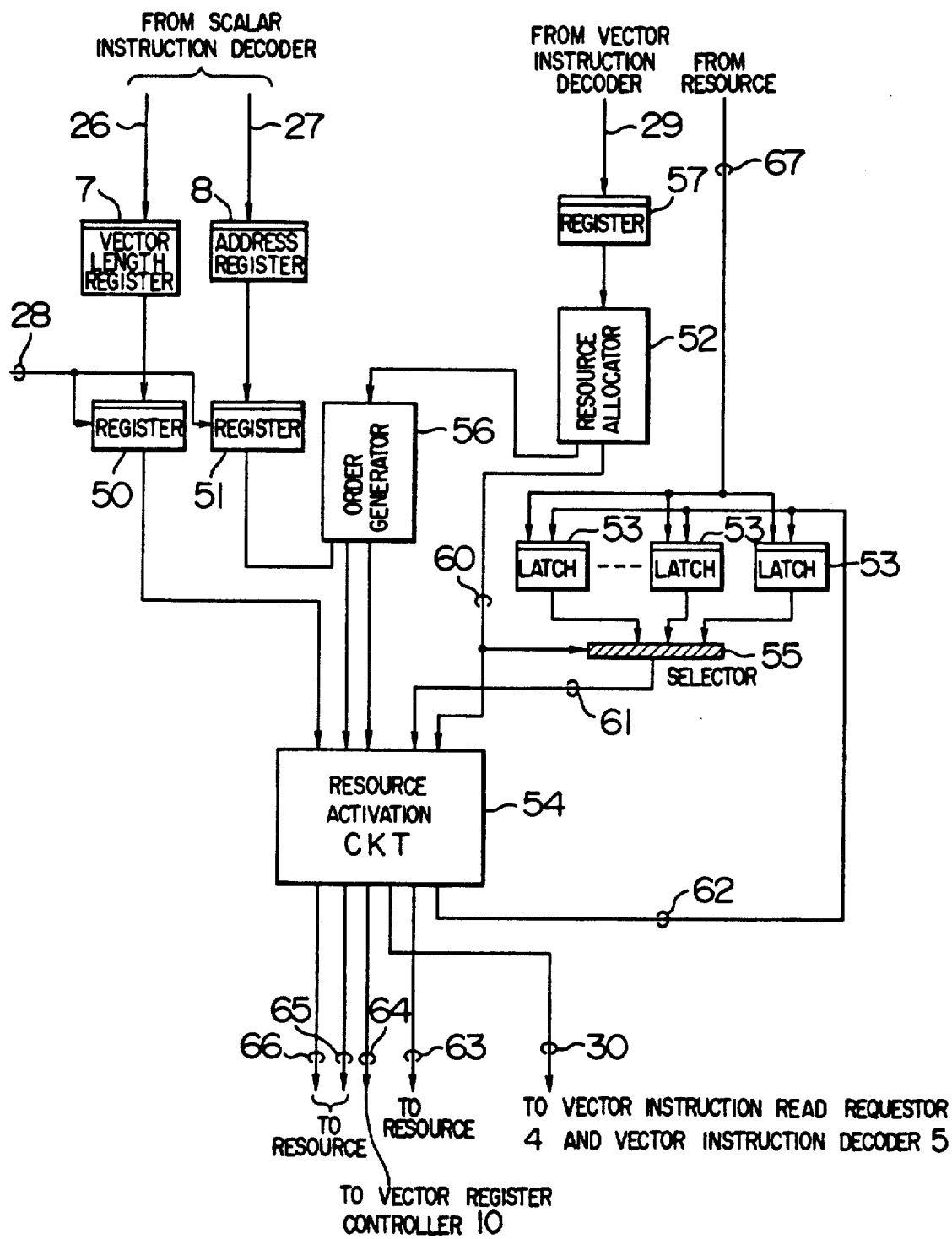
FIG. 5 is a view showing in a block diagram a vector status supervisor circuit employed in the apparatus shown in FIG. 2.

Next, operation of the vector status supervisor circuit 9 shown in FIG. 2 will be described by referring to FIG. 5. Upon completed execution of the processing of the EXVP instruction, the scalar instruction decoder 3 sends out a command signal on the path 28. This signal serves as a load signal for registers 50 and 51 to cause the values of the vector length register 7 and the address register 8 to be stored in the registers 50 and 51, respectively, after execution of the EXVP instruction. Accordingly, after the completed execution of the EXVP instruction, the scalar processing unit is allowed to start the set-up processing required for the execution of a vector instruction chain succeeding to the activated vector instruction chain.

In the activated vector processing unit, a vector instruction is sent to a resource allocation circuit 52 from the vector instruction decoder 5 by way of the path 29 and the register 57. The resource allocation circuit 52 transforms the operation code of the vector instruction into an identification number of the resource required for executing the vector instruction. In conjunction with the vector processing apparatus under consideration, it is assumed that the individual resources are numbered definitely. The resource number as created is sent onto a path 60.

Latches 53 are incorporated in the vector status supervisor circuit 9 in correspondence to the individual resources, respectively. When the value held by a given one of the latches is "1", this means that the resource associated with that given latch is performing the vector processing, while the value "0" held by the latch means that the associated resource is in the stand-by state. The resource number sent onto the path 60 is transmitted to a resource activating circuit 54 and at the same time sent to a selector 55 to select the status of the resource required for executing the vector instruction, the results of selection being sent to the resource activation circuit 54 by way of a path 61. On the other hand, order information required for activation of the resource allocated to the execution of the vector instruction is created by an order generating circuit 56 to be subsequently sent to the resource activation circuit 54.

In the resource activation circuit 54, when a resource is found to be in the stand-by state, the associated latch 53 is set to "1" through the path 62. At that time, only the associated latch identified by the corresponding resource number as determined by the resource allocation circuit 53 is set. Simultaneously, the resource activation signal is sent to the selected resource through the path 63, while control information is supplied to the vector register controller 10 through a path 64. Further, information of vector length and the address is sent to the individual resources. However, in case a resource is a vector arithmetic unit, the address information is not necessarily sent to that resource.

When the allocated resource is in the processing state, a vector-reading inhibit signal is sent onto the path 30 from the resource activation circuit 54. This inhibit signal causes the vector instruction reading and decoding processing to be interrupted. The interruption continues until the completion of processing by the resource is informed to the associated latch 53 by way of the path 67 to thereby allow the vector status supervisor circuit 9 to clear the interruption. The register 57 is provided for checking the states of the resources every machine cycle.

Next, description will be made of the vector instruction processing operation by referring to FIG. 2. Simultaneously with activation of a resource by the vector status supervisor circuit 9, vector length data is sent onto the path 65. When the resource is a memory requester, the vector length data is loaded in the register 18 incorporated in the memory requester, whereby the vector length data is held by the register 18 during processing execution by the requester. More specifically, the memory requester 15 reads out the vector element having the vector length held by the register 18 from the main storage at a designated address thereof. In case the resource is a vector arithmetic unit 13, the vector length data is loaded in the register 19 incorporated in the vector register controller 10. The latter then controls the switching circuit 11 and 12 to establish a data path for supplying to the vector arithmetic unit 13 the data required for the arithmetic operation while allowing the result of the arithmetic operation to be written in the vector register 14. Simultaneously, the end element of the vector data is identified with the aid of the vector length data placed in the register 19. In this way, the vector register holds the attribute of the vector length. The address data is also mapped onto the requester 17 incorporated in the memory requester 16 through the path 66.

By performing the control concerning the vector length and the address register, justifiability of the processing operation of the vector instruction chain activated by the EXVP instruction can be assured. Although the vector processing unit is shown in FIGS. 2 and 5 as being constituted by one address register, one vector arithmetic, and two memory requesters for simplification of illustration, it should be appreciated that the control through the similar processing can be realized in the case where a plurality of registers and resources are provided. However, when a code which requires chaining operation among the vector registers of different vector lengths is to be executed, justifiability of the processing operation must be assured by the programmer.

According to the present invention, processing over a plurality of DO loops and multi-loop processing appearing in matrix computation can be performed by making use of the optimizing function of compiler at a speed significantly increased when compared with the conventitonal vector processing apparatus. By way of example, upon processing of two DO-loops mentioned below:

```
DO 100 I = 1, N
```

```
                    -continued
                A(I) = B(I) + C(I)
        100 CONTINUE
                DO 200 I = 1, M
                X(I) = Y(I) * Z(I)
        200 CONTINUE.
```

They are first translated into object codes mentioned below and processed in such a manner as illustrated in a time chart shown in FIG. 6a.

| Scalar object: | Setup instructions for loop '100' |
| --- | --- |
| | EXVP Vector object = 'LABEL 1' |
| | Setup instructions for loop '200' |
| | EXVP Vector object = 'LABEL 2' |
| | . |
| | . |
| Vector object: | . |
| LABEL 1: | Vector load VR0 ← 'B' |
| | Vector load VR1 ← 'C' |
| | Vector Add VR2 ← VR0 + VR1 |
| | Vector Store VR2 → 'A' |
| | Vector Processing END |
| LABEL 2: | Vector load VR0 ← 'Z' |
| | Vector load VR1 ← 'Y' |
| | Vector Multiply VR2 ← VR0 * VR1 |
| | Vector Store VR2 → 'X' |
| | Vector Processing END. |

Figure 6A:
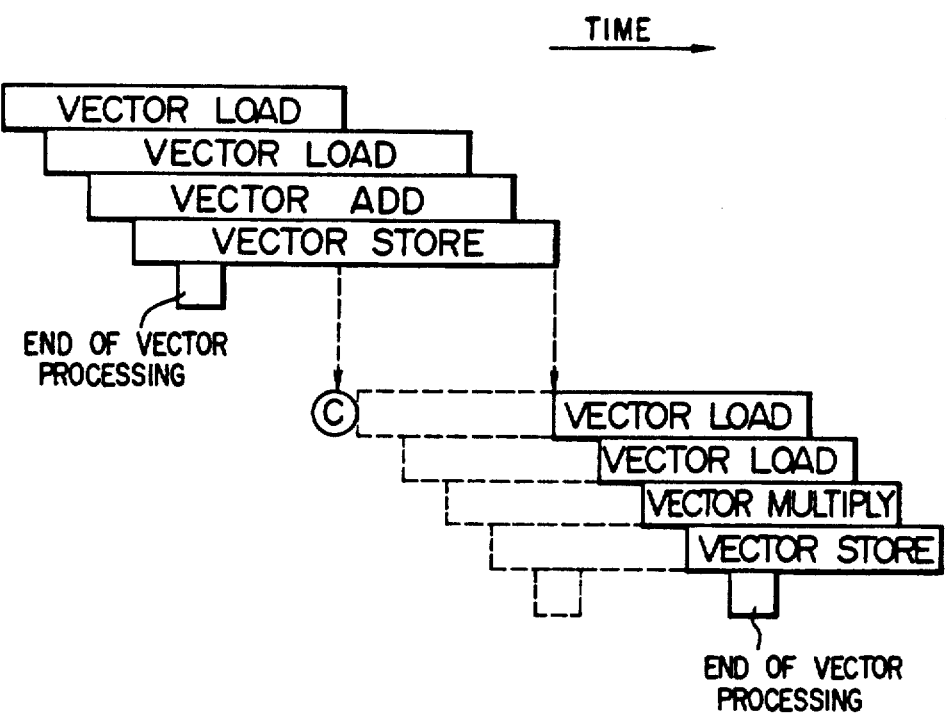
FIGS. 6a and 6b are views for illustrating the processing of a vector instruction comparatively with the prior art method.

With the vector processing apparatus according to the present invention, decoding of a succeeding vector instruction can be started upon completion of the decoding of a preceding vector instruction, whereby the processing of DO "200" can be started at an earlier time point indicated by ⓒ in FIG. 6a at which the vector register VR0 becomes idle. In other words, the time chart shown in FIG. 6a is changed as indicated by broken lines.

Now, consideration is paid to the vector register number in conjunction with the vector instruction chain. The vector register number described in the operand field of a vector instruction represents a temporary storage location indicating the chaining operation and a storage region for an array or the like to be held across a plurality of DO loops. In this connection, these two different attributes can be discriminatively identified by a compiler. In this way, the compiler can take advantage of the usage of two attributes of the vector register number over a plurality of DO loops to thereby perform the translation of the vector register number so that the resources of the vector processing can be utilized to a possible maximum. To this end, the object codes mentioned above may be translated as follows:

| Vector object: | |
| --- | --- |
| LABEL 1: | Vector load VR0 ← 'B' |
| | Vector load VR1 ← 'C' |
| | Vector Add VR2 ← VR0 + VR1 |
| | Vector Store VR2 → 'A' |
| | Vector Processing END |
| LABEL 2: | Vector load VR3 ← 'Z' |
| | Vector load VR4 ← 'Y' |
| | Vector Multiply VR5 ← VR3 * VR4 |
| | Vector Store VR5 → 'X' |
| | Vector Processing END. |

Figure 6B:
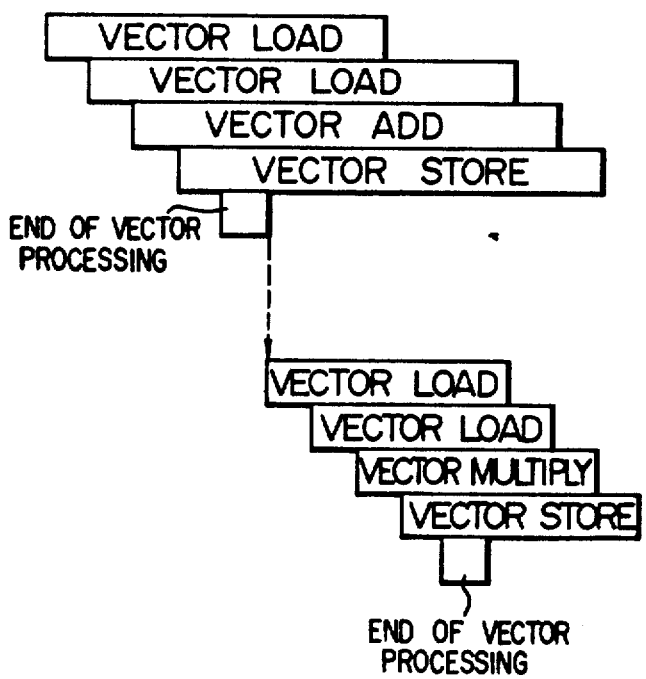

Thus, the processing illustrated by a time chart shown in FIG. 6b can be realized. As will be seen in FIG. 6b, the vector instruction processing can be carried out over two loops DO "100" and "200" without discontinuation, whereby parallel processing operations corresponding to the number of resources of the vector processing apparatus can be automatically accomplished.

The processing operation described above is particularly effective in the computation of matrices expressed in terms of a multiplicity of loops. For example, consider arithmetic operation among the lower triangular matrices given by

```
DO 100 J = 1, N
DO 100 I = J, N
A(I, J) = B(I, J) + C(I, J)
100 CONTINUE.
```

In the case of the hitherto known vector processing apparatus, the vector length varies from 1 to N, involving remarkable degradation in the performance of the vector processing apparatus for the short vector length. Consequently, the advantages inherent to the vector processing apparatus can not be expected for the whole matrix computation. In contrast, with the vector processing apparatus according to the present invention, the vector processing for the inner DO loops can be performed continuously by adopting appropriate procedure for the translation of the vector register numbers. An example of the results of translation of the vector register numbers is described below.

| Scalar object: | 'N' even/odd judgment if N = even then go to LABEL 0 | |
|---|---|---|
| | Setup instructions for 'J = 1' | ⎫ Processing of fraction |
| | EXVP Vector object = 'LABEL 1' | ⎭ |
| LABEL 0: | Setup instructions for 'J = 2, 4, . . .' | |
| | EXVP Vector object = 'LABEL 2' | |
| | Setup instructions for 'J = 3, 5, . . .' | |
| | EXVP Vector object = 'LABEL 3' | |
| | BCT LABEL 0 | |
| Vector object: | | |
| LABEL 1: | Vector load VR0 ← 'C' (J = 1) | |
| | Vector load VR1 ← 'B' (J = 1) | |
| | Vector Add VR2 ← VR0 + VR1 | |
| | Vector Store VR2 → 'A' (J = 1) | |
| | Vector Processing END | |
| LABEL 2: | Vector load VR3 ← 'C' (J = 2n) | |
| | Vector load VR4 ← 'B' (J = 2n) | |
| | Vector Add VR5 ← VR3 + VR4 | |
| | Vector Store VR5 → 'A' (J = 2n) | |
| | Vector Processing END | |
| LABEL 3: | Vector load VR0 ← 'C' (J = 2n + 1) | |
| | Vector load VR1 ← 'B' (J = 2n + 1) | |
| | Vector Add VR2 ← VR0 + VR1 | |
| | Vector Store VR2 → 'A' (J = 2n + 1) | |
| | Vector Processing END. | |

As will be appreciated form the foregoing description, processing which takes advantage of the parallelism inherent to the matrix computation at maximum can be realized by combining the vector processing apparatus according to the present invention with a compiler imparted with the function of translating the vector register number.

The invention has now provided a vector processing apparatus in which the vector processing unit can be activated at a higher speed because of such arrangement in which upon completion of the decoding processing for a preceding vector instruction chain, the processing for a succeeding vector instruction chain can be started.

We claim:

1. A vector processing apparatus, comprising:
   means for processing a vector instructional chain, the vector processing means including a vector instruction decoder and means for executing a vector instruction;
   means for processing a scalar instruction, the scalar processing means including means for commanding the processing, inclusive of decoding and execution, of vector instructions in said vector instruction chain by said vector processing means in response to a scalar instruction which commands effecting a start of the processing of said vector instruction chain; and
   means for effecting the initiation of the processing of a next vector instruction chain by said vector processing means in response to an end of the decoding of the last vector instruction of a preceding vector instruction chain, wherein said means for effecting is included in the scalar processing means and includes an indicator which is set in response to the initiation of decoding of said vector instruction chain by said vector instruction decoder and is reset in response to the decoding of a vector instruction at the end of said vector instruction chain;
   wherein said scalar processing means includes a flip-flop for fetching the set/reset state of said indicator in response to a newly decoded scalar instruction commanding the processing of said vector instruction chain, said scalar processing means effecting the initiation of the processing of the next vector instruction chain while said flip-flop is in a set state.

2. A vector processing apparatus, comprising:
   first means for processing a vector instruction chain, said first means including,
   a vector instruction decoder for decoding vector instructions of said vector instruction chain;
   means, responsive to the state of each resource, for indicating that there is no available resource for execution of an instruction,
   a vector instruction read requester for providing the vector instruction to the vector instruction decoder, and
   means, responsive to said means for indicating that there is not available resource, for interrupting decoding of the vector instruction and for interrupting a read request operation;
   second means, coupled to said first means, for providing an indication of whether or not said vector instruction decoder is decoding vector instructions of vector instruction chain, wherein said second means changes state to indicated that said vector instruction decoder is not decoding in response to the end of the last vector instruction of said vector instruction chain; and
   third means for processing a scalar instruction chain, said third means including,
   a scalar instruction decoder for decoding scalar instructions, and
   fourth means for activating said first means, in response to the occurrence of both of two conditions, the first condition being an indication by said second means that said vector instruction decoder is not decoding and the second condition being the decoding by said scalar instruction decoder of a command to initiate vector processing, said fourth means waiting to activate said first means when said vector instruction decoder is decoding a vector instruction of a previously command vector instruction chain.

3. The apparatus of claim 2 wherein said second means comprises:
fifth means for storing an indication signal having a first state when said vector instruction decoder is decoding a vector instruction chain and a second state when said vector instruction decoder is not decoding a vector instruction chain; and
sixth means for resetting said indication signal to said second state from said first state in response to said vector instruction decoder decoding a vector instruction indicating an end of a vector instruction chain.

4. The apparatus of claim 2 wherein said second means comprises;
fifth means for storing an indication signal having a first state when said vector instruction decoder is decoding a vector instruction chain, and a second state when said vector instruction decoder is not decoding said vector instruction chain; and
sixth means for resetting said indication signal to said second state from said first in response to said vector instruction decoder decoding a vector instruction indicating an end of a vector instruction chain; and
said third means further comprising:
seventh means, responsive to the state of said indication signal and a decoded scalar instruction signal, for transmitting an activation signal to said first means when said indication signal is in said second state and a newly decoded scalar instruction commands initiation of processing of a next vector instruction chain.

5. The apparatus of claim 2 wherein said second means comprise,
fifth means for storing an indication signal having a first state when said vector instruction decoder is decoding a vector instruction chain and a second state when said vector instruction decoder is not decoding a vector instruction chain; and
sixth means for resetting said indication signal to said second state from first state in response to said vector instruction decoder decoding a vector instruction indicating an end of a vector instruction chain;
said third means further comprising,
seventh means, responsive to the state of said indication signal and a scalar instruction signal, for transmitting an activation signal to said first means when said indication signal is in said second state and a newly decoded scalar instruction signal commands initiation of processing of a next vector instruction chain; and
said vector processing means further comprising,
eighth means for producing a signal to set said indication signal into said first state from said second state in response to said activation signal.

6. In a processing apparatus including a scalar processing unit and a vector processing unit having a decoder and a means to executing vector instructions, a method for controlling a vector processing operation in the vector processing unit comprising the steps of:
decoding a scalar instruction chain;
detecting a command to initiate processing of a vector instruction chain from a decoded scalar instruction;
in response to the state of each resource, detecting that there is no available resource for execution of an instruction;
interrupting decoding of the vector instruction in response to the result of said detecting of no available resource;
indicating whether or not the vector processing unit is decoding a previously commanded vector instruction chain, said step of indicating including the steps of setting a register when said vector instruction decoder is decoding in response to the previously commanded vector instruction chain to start decoding and resetting said register in response to an instruction at the end of said previously commanded vector instruction chain; and
activating the vector processing unit to begin processing a next vector instruction chain if both a command to initiate vector processing of a next vector instruction chain is detected and it is indicated that its decoder is not decoding said previously commanded vector instruction chain.

7. A vector processing apparatus, comprising:
vector processing unit processing a vector instruction chain, said vector processing unit including vector instruction decoder and means for executing a vector instruction;
scalar processing unit processing a scalar instruction, the scalar processing unit including means for commanding the processing of vector instructions in said vector instruction chain by said vector processing unit in response to a scalar instruction which commands a start of the processing of a vector instruction chain; and
means, connected to said scalar processing unit, for setting a flag when said vector instruction decoder starts decoding of the first vector instruction of a vector instruction chain commanded by said scalar processing unit, and for resetting the flag when said vector instruction decoder ends decoding of the last vector instruction of a vector instruction chain commanded by said scalar processing unit, wherein said means for setting a flag includes a register which is set in response to the initiation of decoding of a vector instruction chain by said vector instruction decoder and is reset in response to the decoding of a vector instruction at the end of said vector instruction chain;
wherein, when said flag represents the end of the decoding of the last vector instruction of a previously commanded vector instruction chain, said scalar processing unit commands the processing of a next vector instruction chain by said vector processing means even though said previously commanded vector instruction chain is still being executed by said means for executing a vector instruction;
wherein said scalar processing unit includes a flip-flop for fetching the set/reset state of said register in response to a recently decoded scalar instruction commanding processing of a next vector instruction chain, said scalar processing means effecting the initiation of the processing of the next vector instruction chain in response to the set state of said flip-flop;
whereby the decoding of an instruction of the next vector instruction chain and the execution of an instruction of previously commanded vector instruction chain are performed in said vector processing unit.

* * * * *

UNITED STATES PATENT AND TRADEMARK OFFICE
CERTIFICATE OF CORRECTION

PATENT NO. : 5,073,970

DATED : December 17, 1991

INVENTOR(S) : Tomoo Aoyama, et al

Page 1 of 2

It is certified that error appears in the above-identified patent and that said Letters Patent is hereby corrected as shown below:

| Column | Line | |
|---|---|---|
| TITLE PAGE | | |
| | [75] Inventors: | Change "Tamoo" to --Tomoo--; change "Nurayama" to --Murayama--. |
| Abstract, line 9 | | Change "decodiung" to --decoding--. |
| 1 | 9 | Change "1988" to --1986--. |
| 1 | 28 | Before "system" insert --the--. |
| 2 | 20 | After "invention" insert --,--. |
| 4 | 46 | Change "two information" to --two types of information--. |
| 4 | 62 | Change "resource" to --resources--. |
| 4 | 64 | After "apply" delete "valid". |
| 5 | 17 | Before "erroneous" insert --an--. |
| 5 | 23 | Change "making use of this nature" to --employing it in this manner--. |
| 5 | 30 | After "applies" delete "valid". |
| 6 | 38 | After "out" delete "a". |
| 7 | 61 | Change "In" to --It--. |

UNITED STATES PATENT AND TRADEMARK OFFICE
CERTIFICATE OF CORRECTION

PATENT NO. : 5,073,970
DATED : December 17, 1991
INVENTOR(S) : Tomoo Aoyama, et al It is certified that error appears in the above-identified patent and that said Letters Patent is hereby corrected as shown below:

| Column | Line | |
|--------|------|---|
| 9 | 12 | Change "informed" to --indicated--. |
| 9 | 61 | Before "compiler" insert --the--. |
| 12 | 50 | After "of" insert --the--. |
| 13 | 1 | Change "previously" to --previous--. |
| 13 | 23 | After "first" insert --state--. |
| 13 | 62 | Change "to" to --for--. |

Signed and Sealed this

Thirteenth Day of July, 1993

Attest:

MICHAEL K. KIRK

Attesting Officer    Acting Commissioner of Patents and Trademarks